United States Patent
Ishimori et al.

(10) Patent No.: US 9,206,837 B2
(45) Date of Patent: Dec. 8, 2015

(54) BALL JOINT DUST COVER

(71) Applicant: NOK CORPORATION, Tokyo (JP)

(72) Inventors: Junichi Ishimori, Makinohara (JP);
Noriaki Sato, Makinohara (JP); Koji Kanagawa, Makinohara (JP)

(73) Assignee: NOK Corporation (JP)

( * ) Notice: Subject to any disclaimer, the term of this patent is extended or adjusted under 35 U.S.C. 154(b) by 31 days.

(21) Appl. No.: 14/371,576

(22) PCT Filed: Jan. 15, 2013

(86) PCT No.: PCT/JP2013/050516
§ 371 (c)(1),
(2) Date: Jul. 10, 2014

(87) PCT Pub. No.: WO2013/114938
PCT Pub. Date: Aug. 8, 2013

(65) Prior Publication Data
US 2015/0003893 A1    Jan. 1, 2015

(30) Foreign Application Priority Data

Feb. 2, 2012  (JP) .................................. 2012-020433
Jul. 23, 2012  (JP) .................................. 2012-162226

(51) Int. Cl.
*F16C 11/06* (2006.01)
*F16J 3/02* (2006.01)
(Continued)

(52) U.S. Cl.
CPC ............. *F16C 11/06* (2013.01); *F16C 11/0671* (2013.01); *F16J 3/042* (2013.01); *F16J 15/52* (2013.01); *F16J 3/02* (2013.01); *Y10T 403/16* (2015.01); *Y10T 403/32729* (2015.01)

(58) Field of Classification Search
CPC ............. F16C 11/0666; F16C 11/0671; F16C 11/0676; F16J 3/02; F16J 3/04; F16J 3/042; F16J 3/048; F16J 15/52; F16J 15/525
USPC .............. 464/173–175; 403/50, 51, 134, 288; 277/634–636; 74/18–18.2
See application file for complete search history.

(56) References Cited

U.S. PATENT DOCUMENTS 3,248,955 A * 5/1966 Templeton ...................... 403/50
4,322,175 A * 3/1982 Szczesny ....................... 403/134
(Continued)

FOREIGN PATENT DOCUMENTS

JP    S62-137408 A    6/1987
JP    H04-027215 U    3/1992
(Continued)

*Primary Examiner* — Josh Skroupa
(74) *Attorney, Agent, or Firm* — Harness, Dickey & Pierce, P.L.C.

(57) ABSTRACT

In an elastic ball joint dust cover structured such that a spherical head portion formed in one end of a ball stud is retained within a socket, a shaft in the other end of the ball stud is fastened to a knuckle, a large-diameter opening portion is fixed and retained to an outer peripheral surface of the socket, a small-diameter portion having a reinforcing ring embedded therein is retained to the shaft, the reinforcing ring is constructed by a tubular portion, and a flange portion extending from an end portion of the tubular portion toward the shaft, and is integrated with the small-diameter portion in such a manner that a side surface of the flange portion at a side of the knuckle and an inner peripheral surface of the flange portion facing a peripheral surface of the shaft are exposed.

2 Claims, 5 Drawing Sheets

(51) Int. Cl.
*F16J 15/52* (2006.01)
*F16J 3/04* (2006.01)

(56) References Cited

U.S. PATENT DOCUMENTS 4,650,362 A * 3/1987 Kubo ............................ 403/134
5,267,725 A * 12/1993 Wode et al. ................ 267/64.27
6,092,954 A * 7/2000 Mizutani ....................... 403/140
6,350,075 B1 * 2/2002 Abels ............................ 403/134
2003/0118395 A1 * 6/2003 Abels et al. ..................... 403/90
2003/0202842 A1 * 10/2003 Abels ............................ 403/134

FOREIGN PATENT DOCUMENTS

JP 2007-247824 A 9/2007
JP 2009-030793 A 2/2009

* cited by examiner

BALL JOINT DUST COVER

CROSS-REFERENCE TO RELATED APPLICATIONS

This application is a U.S. National Stage Application of International Application No. PCT/JP2013/050516 filed on Jan. 15, 2013, and published in Japanese as WO 2013/114938 A1 on Aug. 8, 2013. This application claims priority to Japanese Application Nos. 2012-020433 filed on Feb. 2, 2012 and 2012-162226 filed on Jul. 23, 2012. The entire disclosures of the above applications are incorporated herein by reference.

BACKGROUND OF THE INVENTION

1. Field of the Invention

The present invention relates to a ball joint dust cover.

Further, the present invention relates to a ball joint dust cover which is used in an automobile suspension device, and a steering device.

2. Description of the Conventional Art

Conventionally, as a ball joint to which a dust cover is installed for the purpose of preventing dust and from infiltrating in a ball joint coupling portion, there has been known a ball joint dust cover which is shown in FIG. 5 (see also, Japanese Unexamined Patent Publication No. 62-137408).

In a seal structure of this kind of ball joint dust cover, a spherical head portion 200 formed in one end of a ball stud 100 is retained within a socket 300.

Further, a shaft 400 in the other end of the ball stud 100 is fastened and fixed to a knuckle 500.

On the other hand, a large-diameter opening portion 800 formed as an approximately C-shaped cross sectional form at one end of a dust cover 600 made of a rubber-like elastic material is fixed and retained within an annular groove portion 310 which is formed in an outer peripheral surface of the socket 300 by an annular pressure ring 700, and a small-diameter opening portion 150 at the other end of the dust cover 600 is retained to the shaft 400.

The pressure ring 700 employs a circlip which is formed to have an approximately rectangular cross sectional shape.

In this kind of conventional dust cover 600, in the case that the ball stud 100 oscillates while the ball stud 100 is inclined as shown in FIG. 5, a force extending the small-diameter portion 150 is applied to the side in which a film portion of the dust cover 600 extends (a right side on the drawing). Therefore, there is generated a so-called mouth opening phenomenon of the small-diameter portion 150 in which a lip portion of the small-diameter portion 150 and the knuckle 500 are disconnected.

As a result, a seal performance in the small-diameter portion 150 is lowered, and a problem that sedimentation or garbage enters into the dust cover 600 from an external area has been brought about.

Further, it is often the case that the general dust cover has a bell shape as shown in FIG. 5, however, in the case that a diameter difference between the ball stud and the socket is reduced for the reason of downsizing of the socket, it has been deemed necessary to set the shape of the dust cover to a shape similar to a cylindrical shape in place of the bell shape.

As mentioned above, there is a tendency that the closer to the cylindrical shape of the dust cover becomes, the greater is a strain applied to the film portion of the dust cover.

As a result, a durability of the dust cover is lowered, thereby causing a problem that a part on a circumference of the film portion of the dust cover deforms to an inner diameter side at the setting time of the dust cover. Further, a problem that the small-diameter portion of the dust cover falls away from the ball stud has been brought about.

Therefore, it is desired for the shape of the dust cover to maintain the bell shape even if the diameter difference between the ball stud and the socket is reduced.

SUMMARY OF THE INVENTION

Problem to be Solved by the Invention

The present invention is made by taking the problem mentioned above into consideration, and an object of the present invention is to provide a ball joint dust cover which can maintain a shape of a dust cover in a bell shape even in the case that a diameter difference between a ball stud and a socket is reduced, can solve the problem that the small-diameter portion of the dust cover falls away from the ball stud, and has a good durability.

Means for Solving the Problem

A ball joint dust cover according to the present invention is a ball joint dust cover structured such that a spherical head portion formed in one end of a ball stud is retained within a socket, a shaft in the other end of the ball stud is fastened and fixed to a knuckle, a large-diameter opening portion at one end of the dust cover is fixed and retained to an outer peripheral surface of the socket, a small-diameter portion at the other end of the dust cover and having a reinforcing ring embedded therein is retained to the shaft, and is made of an elastic material, wherein the reinforcing ring is constructed by a tubular portion, and a flange portion which extends from an end portion of the tubular portion toward the shaft and proximate the knuckle, and is integrated with the small-diameter portion in such a manner that a side surface of the flange portion near the knuckle and an inner peripheral surface of the flange portion facing peripheral surface of the shaft are exposed.

Effect of the Invention

The present invention achieves effects as described below.

According to the ball joint dust cover of the invention, even if a diameter difference between the ball stud and the socket becomes smaller, it is possible to maintain the shape of the dust cover in the bell shape, it is possible to solve the problem that the small-diameter portion of the dust cover falls away from the ball stud, and durability is good.

Further, according to the ball joint dust cover of the invention, it is possible to more securely solve the problem that the small-diameter portion of the dust cover falls away from the ball stud. Further, since the reinforcing ring can be positioned by the inward end portion in the diametrical direction of the flange portion at the time of molding the dust cover, it is not necessary to set the ring receiving pin in the metal mold, and it is possible to reduce the working man hours for using the metal mold. Further, since a plurality of projections are uniformly provided in the inner peripheral surface which comes into contact with the axial outer peripheral surface of the inward end portion in the diametrical direction, it is possible to reduce a sliding resistance between the ball stud and the reinforcing ring. As a result, it is possible to inhibit buckling (torsion) of the dust cover film portion.

Further, according to the ball joint dust cover of the invention, it is possible to maintain the shape of the dust cover in the bell shape even in the case that a step portion is not provided in the axial outer peripheral surface, and the durability of the dust cover is good.

Further, according to the ball joint dust cover of the invention, since the reinforcing ring can be made thinner, it is possible to maintain the shape of the dust cover in the bell shape even if the diameter difference between the ball stud and the socket becomes smaller.

DETAILED DESCRIPTION OF PREFERRED EMBODIMENTS

A description will be given below of a mode for carrying out the present invention.

Figure 1:
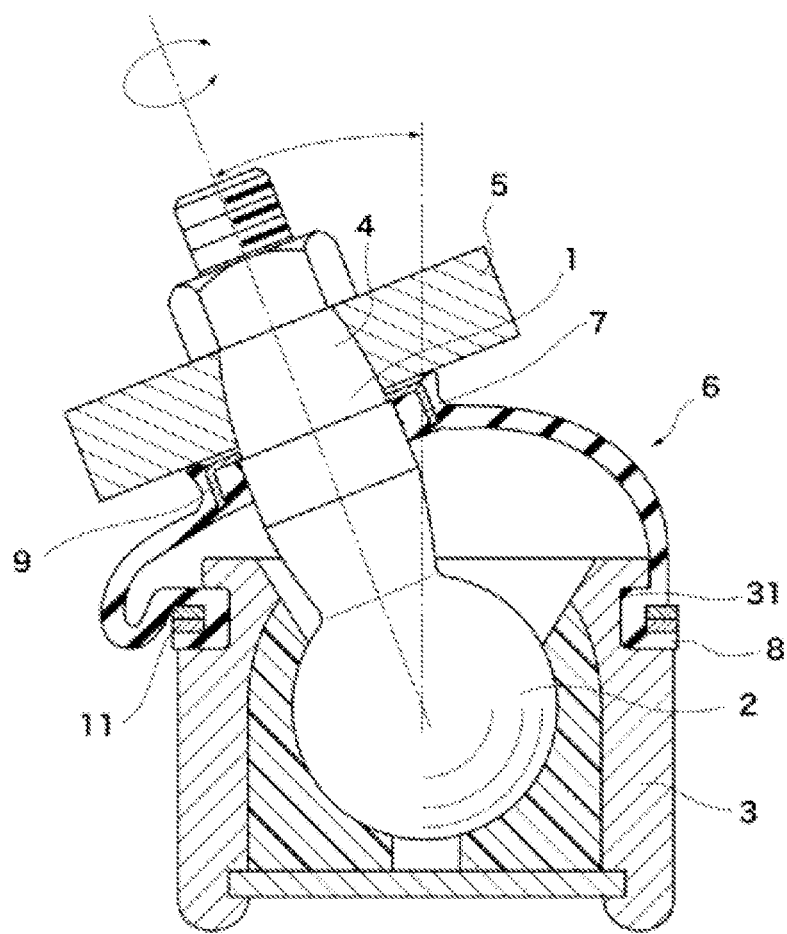
FIG. 1 is a vertical cross sectional view of a ball joint dust cover according to the present invention.
Figure 2:
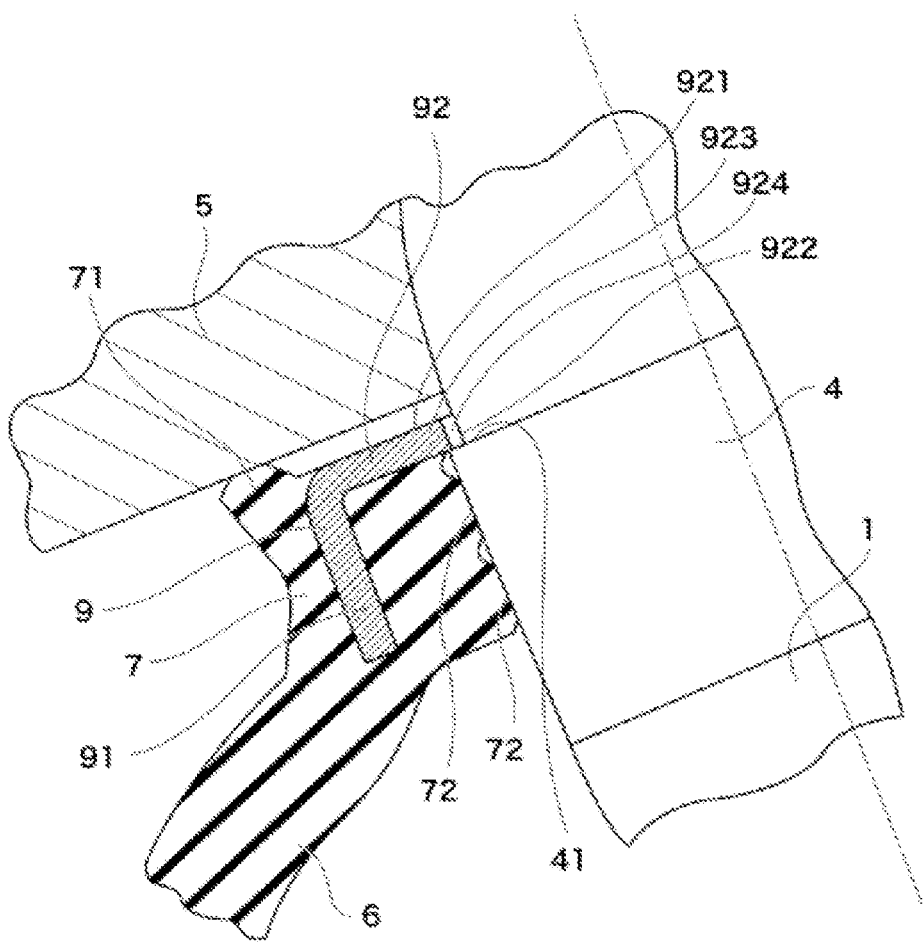
FIG. 2 is a partly enlarged view of a small-diameter portion of the ball joint dust cover in FIG. 1.
Figure 3:
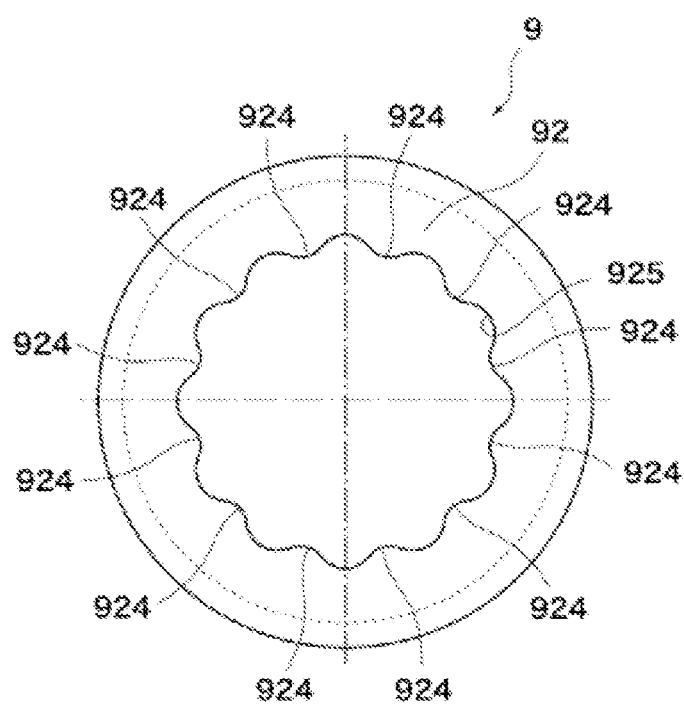
FIG. 3 is a plan view of a reinforcing ring shown in FIG. 2.

As shown in FIGS. 1, 2 and 3, a ball joint dust cover according to the present invention is structured such that a spherical head portion 2 formed in one end of a ball stud 1 is retained within a socket 3, a shaft 4 in the other end of the ball stud 1 is fastened and fixed to a knuckle 5, a large-diameter opening portion 8 at one end of the dust cover 6 is fixed and retained to an outer peripheral surface of the socket 3, and a small-diameter portion 7 at the other end of the dust cover 6 and having a reinforcing ring 9 embedded therein is retained to the shaft 4.

Further, the reinforcing ring 9 is constructed by a tubular portion 91, and a flange portion 92 which extends from an end portion at a side of the knuckle 5 of the tubular portion 91 toward the shaft 4.

Further, the reinforcing ring 9 is integrated with the small-diameter portion 7 in such a manner that a side surface 921 at the side of the knuckle 5 of the flange portion 92 and an inner peripheral surface 922 of the flange portion 92 facing a peripheral surface of the shaft 4 are exposed.

Further, an inward end portion 923 in a diametrical direction of the flange portion 92 protrudes to the shaft 4 side, and engages with an annular step portion 41 which is provided in an outer peripheral surface of the shaft 4.

Accordingly, even if the small-diameter portion 7 is pulled to the spherical head portion 2 side (a downward side in the drawing) by the film portion of the dust cover 6, the inward end portion 923 in the diametrical direction inhibits the displacement to the spherical head portion 2 side in cooperation with the step portion 41.

Further, since the flange portion 92 of the reinforcing ring 9 is structured so as to extend toward the shaft 4, it is possible to further downsize the small-diameter portion 7. Therefore, it is possible to maintain the shape of the dust cover 6 in the bell shape, even in the case that the diameter difference between the ball stud 1 and the socket 3 is reduced.

Further, a plurality of projections 924 each having a circular arc shape are uniformly provided in an inner peripheral surface 922 which comes into contact with an outer peripheral surface of the shaft 4. Therefore, it is possible to reduce a sliding resistance between the ball stud 1 and the reinforcing ring 9. As a result, it is possible to inhibit the buckling (the torsion) of the film portion of the dust cover 6.

The present embodiment is structured such that twelve projections 924 each having the circular arc shape are uniformly provided, however, the number of the projections 924 can be three or more. Further, the projections may be formed in triangular shapes or quadrangular shapes in addition to the circular arc shape, and various shapes can be applied as long as contact with the outer peripheral surface of the shaft 4 is similar to a line contact or a point contact configuration and the sliding resistance is reduced.

Further, an inner diameter of a root portion 925 existing between adjacent projections 924 and 924 has a dimension to prevent the metal mold from coming into contact with an entire surface of the flange portion 92 and to prevent the elastic member from leaking out to the side surface 921 side via the root portion 925, in the case that the seal lip 72 is integrally formed in the flange portion 92 of the reinforcing ring 9.

Specifically, it is desirable that the root portion 925 be accommodated within the step portion 41.

Further, since the shape of the dust cover 6 can be maintained in the bell shape, it is possible to prevent the tendency that the strain applied to the film portion of the dust cover 6 is enlarged. As a result, it is possible to improve a durability of the dust cover 6, and it is possible to avoid a problem that a part on the circumference of the film portion of the dust cover deforms to an inner diameter side when installing the dust cover.

Further, since the reinforcing ring 9 is integrated with the small-diameter portion 7 in such a manner that the side surface 921 at the knuckle 5 side of the flange portion 92 and the inner peripheral surface 922 facing the peripheral surface of the shaft 4 in the flange portion 92 are exposed, it is possible to further downsize the small-diameter portion 7.

Further, grease is sealed within the dust cover 6.

The reinforcing ring 9 is manufactured by a punching operation from a steel plate such as SPCC.

Therefore, since the reinforcing ring 9 can be made thinner in comparison with the case that a resin material is used, it is even more likely to maintain the shape of the dust cover 6 in the bell shape, even in the case that the diameter difference between the ball stud 1 and the socket 3 is reduced.

Further, a material of the dust cover 6 is appropriately selected from a rubber-like material such as chloroprene, and a thermoplastic elastomer such as a polyester elastomer and a thermoplastic polyurethane according to an intended use.

Figure 4:
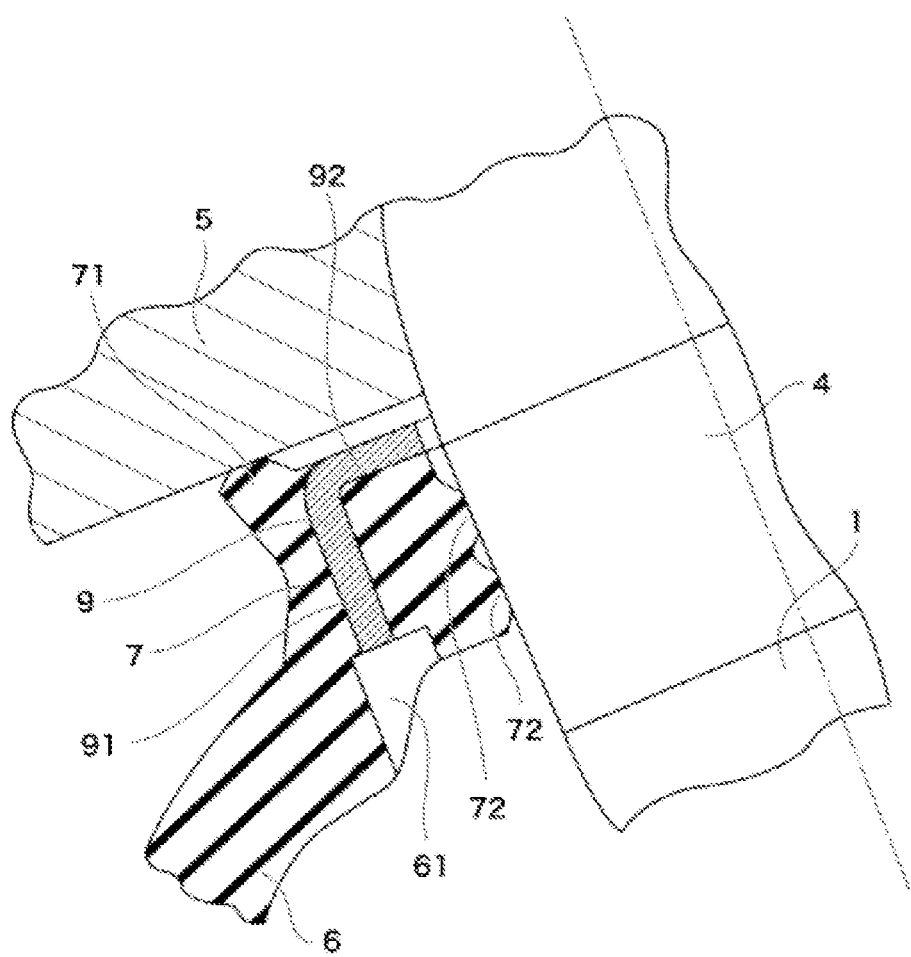
FIG. 4 is a view showing a ball joint dust cover of another aspect according to the present invention in the same manner as FIG. 2.
Figure 5:
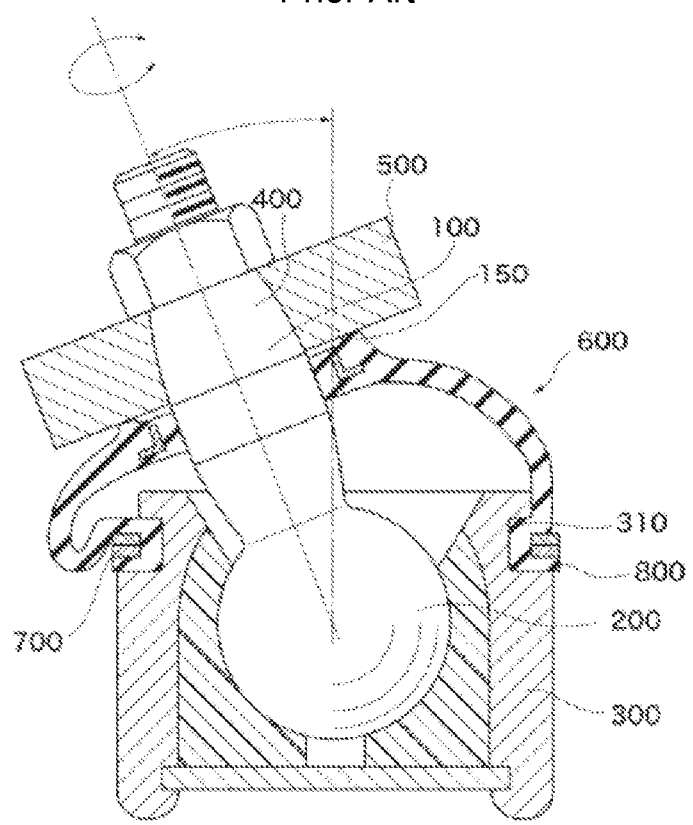
FIG. 5 is a vertical cross sectional view of a ball joint dust cover according to a prior art.

Next, a description will be given of another aspect of the ball joint dust cover according to the present invention with reference to FIG. 4.

A different point from the previously described embodiment is the provision of a pin groove 61 for a ring receiving pin. The pin groove 61 supports the end portion in the spherical head portion 2 side of the tubular portion 91, in place of the protruding inward end portion 923 of the flange portion 92 that protrudes to the shaft 4 side.

According to the structure mentioned above, it is possible to maintain the shape of the dust cover 6 in the bell shape even in the case that the step portion 41 is not provided in the outer peripheral surface of the shaft 4.

As with the first embodiment, grease is sealed within the dust cover 6.

The large-diameter opening portion 8 having an approximately C-shaped cross section in the dust cover 6 made of the rubber-like elastic material is structured so as to be fixed and retained within an annular groove portion 31 which is formed in the outer peripheral surface of the socket 3, by the annular pressure ring 11.

As the pressure ring 11, a circlip having an approximately rectangular cross sectional shape is used.

Further, in the small-diameter portion 7, a dust lip 71 is provided that comes into elastic contact with the knuckle 5, and a seal lip 72 is formed that comes into elastic contact with the outer peripheral surface of the shaft 4.

As a result, it is possible to more effectively inhibit dust from intruding into the dust cover 6 from the external areas, and it is possible to prevent the grease from flowing out of an inner side of the dust cover 6.

Further, it goes without saying that the present invention is not limited to the best mode for carrying out the invention mentioned above, but can employ other various structures without deviating from the scope of the present invention.
Industrial Applicability The present invention can be used in a ball joint which is used in a suspension device and a steering device of a motor vehicle.

What is claimed is:

1. A ball joint dust cover assembly comprising:
    a ball stud having a spherical head at a first end of said ball stud, and a shaft at a second end of said ball stud;
    a socket retaining said spherical head;
    a knuckle fastened and fixed to said shaft;
    an elastic dust cover including:
        a large-diameter opening at a first end of said dust cover, said large-diameter opening being fixed and retained to an outer peripheral surface of said socket;
        a small-diameter opening at a second end of said dust cover, said small-diameter opening being retained to said shaft; and
        a reinforcing ring embedded within said dust cover at said small-diameter opening;
    wherein said reinforcing ring includes:
        a tubular wall extending parallel to an outer peripheral surface of said shaft from a first end proximate said knuckle to a second end opposite the first end; and
        a flange extending from said first end of said tubular portion toward said shaft, and
    wherein said reinforcing ring is integrated with said small-diameter opening such that a side surface of said flange at a side of said knuckle and an inner peripheral surface of said flange facing said outer peripheral surface of said shaft are exposed,
    wherein an inward end portion in a diametrical direction of said flange protrudes toward said shaft and engages a shoulder provided on an outer peripheral surface of said shaft, and
    wherein a plurality of projections are uniformly provided in said inner peripheral surface which comes into contact with said outer peripheral surface of said shaft with said inward end portion in the diametrical direction.

2. The ball joint dust cover assembly according to claim 1, wherein said reinforcing ring is made of a metal material.

* * * * *